United States Patent [19]
Carr et al.

[11] Patent Number: 4,723,626
[45] Date of Patent: Feb. 9, 1988

[54] QUIET NACELLE SYSTEM AND HUSH KIT

[75] Inventors: Thomas W. Carr; Philip M. Rose, both of Chula Vista, Calif.

[73] Assignee: Aeronautic Development Corporation, Ltd., Amsterdam, Netherlands

[21] Appl. No.: 769,141

[22] Filed: Aug. 26, 1985

[51] Int. Cl.⁴ .................................................. F02K 1/44
[52] U.S. Cl. ......................................... 181/213; 181/214; 181/286
[58] Field of Search ................ 181/213, 214, 222, 286

[56] References Cited
U.S. PATENT DOCUMENTS

| | | | |
|---|---|---|---|
| 3,065,818 | 11/1962 | Lombard et al. | 181/213 |
| 3,542,152 | 11/1970 | Adamson et al. | 181/214 |
| 4,235,303 | 12/1980 | Shoore et al. | 181/214 |
| 4,244,441 | 1/1981 | Tolman | 181/213 |
| 4,433,751 | 2/1984 | Bonneau | 181/213 |
| 4,452,335 | 6/1984 | Matthews et al. | 181/214 |

Primary Examiner—Benjamin R. Fuller
Attorney, Agent, or Firm—Cooper, Dunham, Griffin & Moran

[57] ABSTRACT

A quiet nacelle system for jet aircraft engines includes an elongated nose cowl and nose dome of the nacelle and a sound-attenuating liner applied to the nose cowl, nose dome and fan duct components. The system is particularly suitable for JT3D-3B and JT3D-7 engines for use with DC-8 aircraft. The components may be combined as a hush kit for retrofit in existing nacelle systems.

8 Claims, 10 Drawing Figures

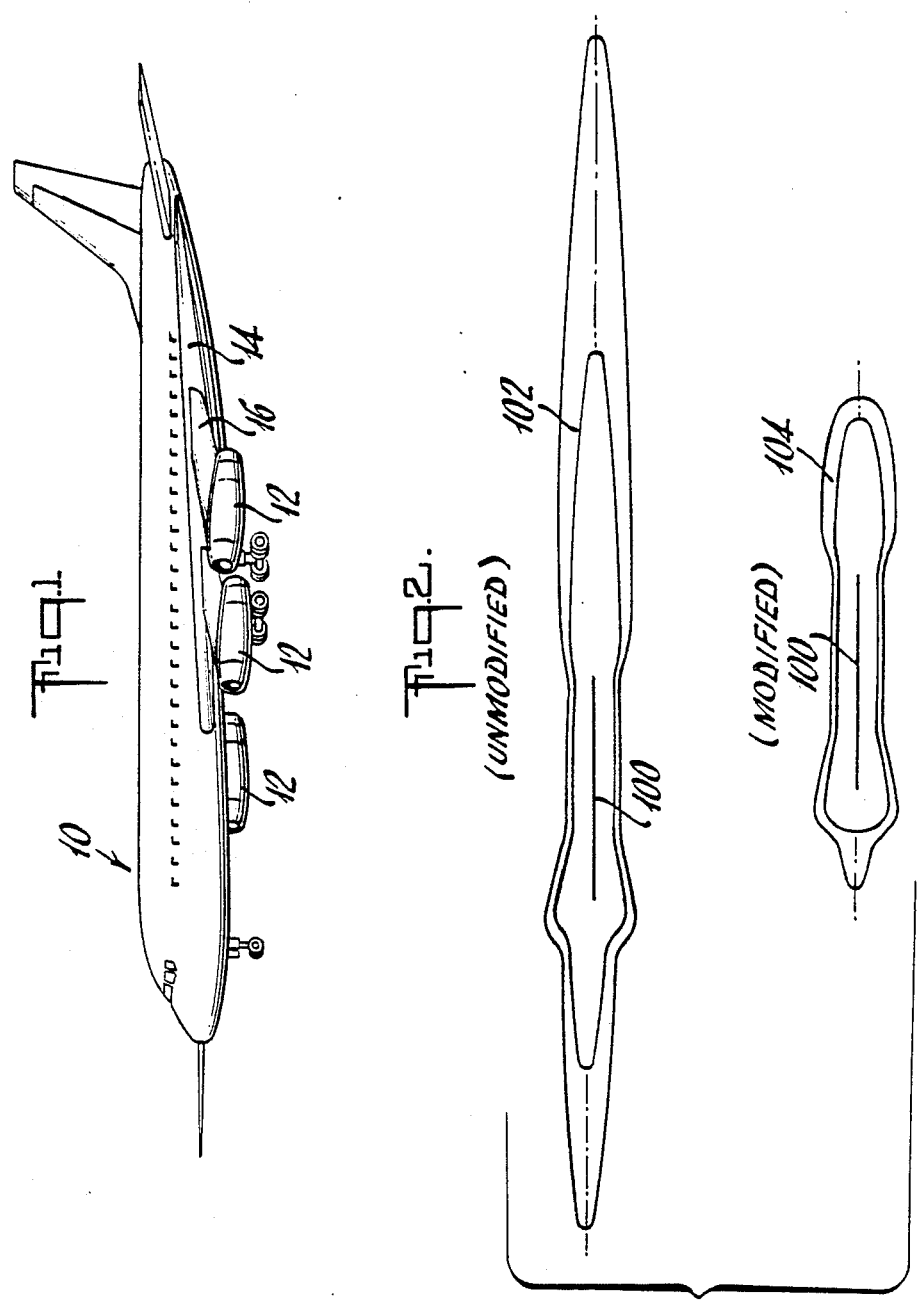

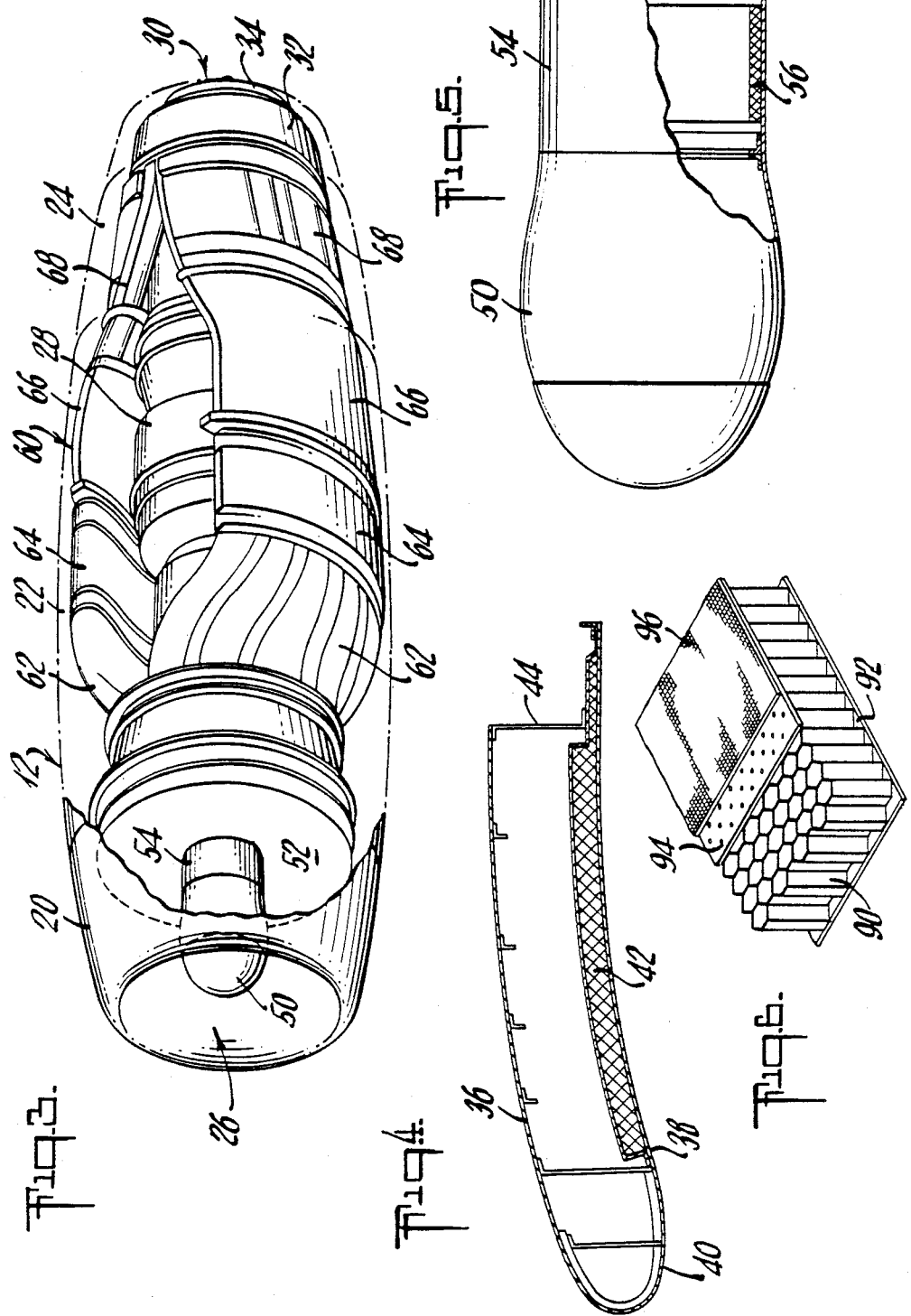

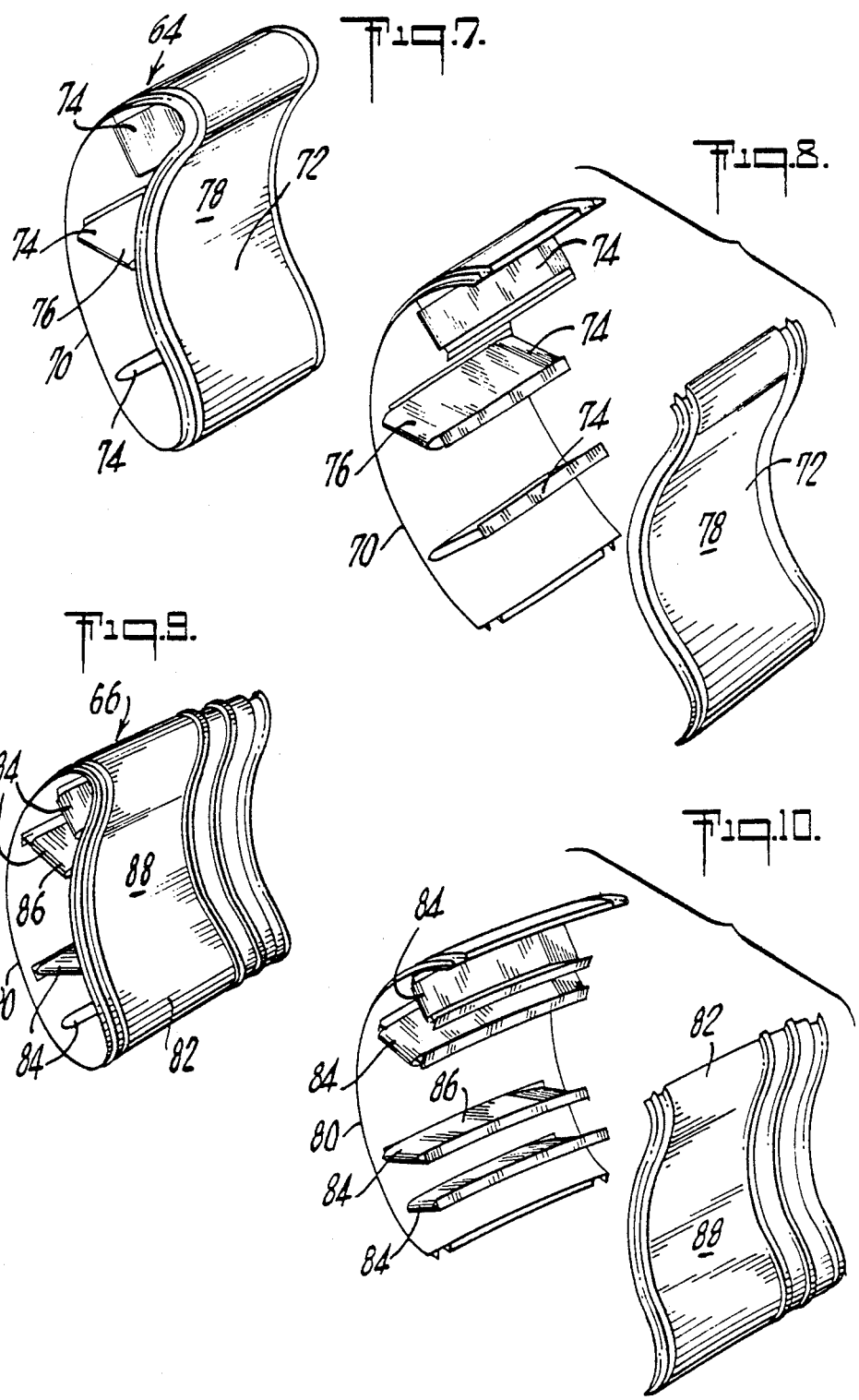

QUIET NACELLE SYSTEM AND HUSH KIT

BACKGROUND OF THE INVENTION

Prior to 1969, the aircraft industry paid little concern to commercial jet aircraft engine noise. In December 1969, the U.S. Federal Aviation Administration ("FAA") promulgated specific noise level regulations for aircraft under authority of Public Law 90-411. Existing airplanes were required to be certificated for compliance with Federal Air Regulation No. 36 ("FAR 36"). Similar noise standards were prescribed by international civil aviation organizations (for example, "ICAO Annex 16"). Several states and municipalities also established airport noise levels. Thus, it became imperative for airframe and engine manufacturers and owners to take noise considerations into account in designing, building and using jet aircraft.

By December 1970, Douglas Aircraft Co., on behalf of the National Aeronautics and Space Administration, had undertaken studies concerning fan-compressor noise from the Pratt & Whitney JT3D-3B engines used with DC-8-50/61 airplanes made by Douglas. The studies showed that noise levels might be reduced in a short duct nacelle design having revised fan inlet and exhaust ducts containing acoustically absorptive linings. Various configurations were tested. Although it was shown that typically up to 10.5 EPNdB ("effective perceived noise") reduction in the noise level could be achieved (at maximum certified landing weight and at a point on the ground beneath a 3° landing-approach path one nautical mile from the runway threshold), static take-off-rated gross thrust was reduced by 2.5% and fuel consumption was increased by 3%. Moreover, direct operating costs were estimated to increase 4.4% and return on investment would decline about 6%.

At the same time, The Boeing Co. was conducting similar studies of noise reduction of JT3D engines used with Boeing 707-320C airplanes. The studies showed that noise reductions up to 15 EPNdB could be achieved on landing approach. It was planned to accomplish this reduced noise level by installing two acoustically treated rings in the engine inlet and by acoustically treating an extended ¾ length fan duct configuration. That modification resulted in a range reduction of 200 nautical miles and a direct operating cost increase of more than 9%. Further, the use of rings may interfere with de-icing of the engines.

Thereafter, the major airframe manufacturers undertook substantial research effort toward developing retrofit kits for existing airplanes to attempt to meet FAR 36 noise level requirements. However, they were unable to develop kits which would meet the noise requirements without, at the same time, degrading performance, increasing fuel consumption and unreasonably increasing costs. As a result of the unavailability of retrofit hush kits, the value of existing airplanes fell significantly as their useful lives neared an end. As of Oct. 1, 1979, there were about 155 DC-8 airplanes with JT3D engines in service by U.S. airlines and about 218 in service by foreign airlines. Although the effective date of the FAR 36 noise requirements was extended on several occasions, and the requirements were modified, the regulation finally became effective as of Jan. 1, 1985. On that date, the existing DC-8 airplanes became essentially obsolete for use in the United States.

The studies which had been conducted showed that noise radiates from a low by-pass, fan jet engine in several directions. High-frequency fan noise radiates both forward through the air inlet cowl and aftward through the exhaust ducts. Low-frequency jet noise generally radiates rearwardly. At low engine thrust, the high-pitch whine of the fan is more pronounced. At high engine thrust, the low-pitch jet rumble is more noticeable.

Each noise component must be dealt with separately, as well as in combination. Generally, some studies showed that noise attenuation material was useful for reducing some noise components. One type of material frequently used consists of honeycomb core cells bonded to a porous sheet on the airflow surface and an impervious sheet on the rearward surface. Such noise attenuation material has been used in several different nacelle configurations for different airplanes.

Other studies showed that nacelle modifications could suppress engine noise. However, these modifications which, it appeared, could succeed in suppressing noise would also severely degrade airplane performance or substantially increase fuel consumption.

Thus, although existing DC-8 airplanes could not be used, at least in the United States, after implementation of the FAR 36 noise level requirements, no one had developed and certified with the FAA a system to reduce the noise levels and thereby make the obsolete DC-8 airplanes economically viable.

SUMMARY OF THE INVENTION

One object of the present invention is to provide an aircraft jet engine nacelle adapted to permit engine operation at low noise levels at take-off and landing.

Another object of the invention is to provide a nacelle system for a jet engine which reduces engine noise to a quiet level conforming with governmental airplane noise regulations, while maintaining airworthiness and flight performance of the airplane.

Still another object of the invention is to provide a retrofit kit for existing jet airplanes which will permit continued operation of airplanes which otherwise would not comply with governmental noise regulations and could not be flown.

The present invention contemplates achieving these objects through use of a combination of nacelle structural modifications and properly positioned sound attenuating material. To that end, the nose cowl of the nacelle is elongated and an acoustic liner is used on the airflow surface. The nose dome is extended to conform to the nose cowl elongation and the nose dome extension has an acoustic liner on the airflow surface. The fan ducts are provided with acoustic liners on the airflow surfaces, and the splitters also are provided with acoustic liners on the airflow surfaces. The preferred acoustic liner is a single-layer honeycomb sandwich material.

The nacelle system of the present invention is particularly adapted for use with Pratt & Whitney JT3D-3B and JT3D-7 engines, for use with Douglas DC-8-62 and DC-8-63 aircraft, but is also useful with similar aircraft and engines.

DESCRIPTION OF THE DRAWINGS

FIG. 1 is a perspective view of a DC-8 aircraft equipped with quiet nacelles in accordance with the present invention.

FIG. 2 is a graph depiction of the reduced noise level contours achieved by the present invention as compared to an unmodified nacelle system.

FIG. 3 is a perspective view, partially cut-away, of the nacelle system for a DC-8 aircraft.

FIG. 4 is an elevational, cross-sectional view of the inlet cowl of the nacelle system.

FIG. 5 is an elevational, cross-sectional view partially cut-away, of the nose dome.

FIG. 6 is a perspective view, partially cut-away, of the sound-attenuating material.

FIG. 7 is a perspective view of the constant section fan duct assembly.

FIG. 8 is an exploded, perspective view of the constant section fan duct assembly.

FIG. 9 is a perspective view of the transition section fan duct assembly.

FIG. 10 is an exploded, perspective view of the transition section fan duct assembly.

DETAILED DESCRIPTION OF THE INVENTION

Generally, as shown in FIG. 1 of the drawings, the present invention relates to a jet airplane 10 having a plurality of nacelles 12 suspended from the airplane wings 14 by pylons 16. Each nacelle 12 contains a jet engine adapted to propel the plane. The nacelles 12 are modified in accordance with the present invention so as to operate at noise levels which meet governmental noise regulations, including particularly FAR 36, and still maintain airworthiness and structural integrity under other parts of FAA regulations.

The nacelles 12 are shown in greater detail in FIG. 3. Each nacelle 12 includes a housing comprising a nose cowl 20, a forward cowl 22 trailing the nose cowl 20, and an aft cowl 24 trailing the forward cowl 22. The nose cowl 20 defines the inlet 26 to the nacelle. The forward cowl 22 and aft cowl 24 circumscribe the fan, combustion and turbine sections of the engine 28. The exhaust 30 of the engine is defined by the thrust reverser 32 and nozzle 34. Other than as described herein, each of those elements is a standard component in existing nacelle systems known to those skilled in the art.

The nose cowl 20 of the nacelle 12 is modified in accordance with the present invention to have an extension or elongation beyond the nose cowl length conventionally employed in existing nacelle systems for DC-8 airplanes in use at the present time. It has been found that an extension of approximately 12 inches provides, in combination with the other components of the system, particularly effective reduction in noise levels. A longer extension is unnecessary and adds weight to the system without improving performance. The term "elongated nose cowl", as used herein, means a nose cowl which has been extended to about that optimum length.

As best seen in FIG. 4, the nose cowl 20 comprises an outer barrel 36, which forms the exterior surface, an inner barrel 38 which forms the interior airflow surface and a lip assembly 40 connecting the inner and outer barrels and which includes the anti-icing system for the engine. The inner barrel 38 is lined or bonded with sound-attenuating material 42 on the airflow surface. However, the sound-attenuating material 42 is not applied to the lip assembly 40, so as to avoid interference with the anti-icing system. It has been found that the forward edge of the sound-attenuating material 42 should be located about 6 inches behind the lip assembly for that reason. Preferably, the material 42 forms a liner having two different thicknesses. It has been found that the material desirably has a thickness of about $\frac{3}{4}$ inch for most of the length of the inner barrel 38, but that the thickness should be reduced to less than $\frac{1}{2}$ inch for the rearwardmost portion of the material adjacent the engine attachment flange at the aft bulkhead 44. This facilitates attachment of the engine 28.

The nose dome 50 extends from the fan 52 of the engine 28, as shown in FIG. 3. The nose dome 50 is bullet shaped and conforms to the shape of the inner barrel 38 of the nose cowl 20, so as to provide smooth airflow through the inlet 26. The nose dome 50 of the nacelle 12 is modified in accordance with the present invention to have an extension or elongation 54 adjacent the fan 52. The extension 54 preferably should be about 12 inches in length to cooperate and provide effective sound attenuation in combination with the extended nose cowl 20. The pitotstatic PT 2 probe and anti-icing system incorporated in the nose dome are not affected by the extension.

As best seen in FIG. 5, the existing nose dome 50 is not structurally changed, but the extension 54 is attached between the rearward portion of the nose dome 50 and the fan 52. The entire extension 54 is lined or bonded with sound attenuating material 56 on the airflow surface. However, the sound-attenuating material 56 is not applied to the unmodified portion of the nose dome 52, so as to avoid changing the airflow characteristics in the inlet. It is desirable to avoid changing the airflow liner and aerodynamic loft lines, because any such changes may affect the performance and airworthiness of the plane.

Fan ducts 60 extend rearwardly from the engine fan 52. Compressed air is forced through the fan ducts 60 to provide increased thrust for the engine. The fan ducts 60 must be configured to fit in the narrow space between the outer housing provided by the forward cowl 22 and aft cowl 24 and the jet engine 28. A nacelle which has fan ducts 60 extending from the fan 52 to the thrust reverser 32 is referred to herein as a "long fan duct" nacelle.

As shown in FIG. 3, the fan ducts 60 comprise pairs of bifurcation fan ducts 62, constant section fan ducts 64 trailing the bifurcation fan ducts 62, transition section fan ducts 66 trailing the constant section fan ducts 64 and aft section fan ducts 68 trailing the transition section fan ducts 66 and leading to the thrust reverser 32. It has been found that, in the combination of the present invention, no sound-attenuating material is necessary for the bifurcation fan ducts 62 and aft section fan ducts 68.

The constant section fan duct assemblies 64 are shown in FIGS. 7 and 8. Each constant section fan duct 64 comprises an outer duct wall 70, an inner duct wall 72 and a plurality of separators or splitters 74 which hold the inner and outer walls together at a constant distance against the great thrust exerted by the fan 52. Each of the inner and outer walls 70, 72 and each of the splitters 74 has a sound-attenuating liner 76 on the airflow surface thereof. It has been found particularly effective to form the splitters 74 of the acoustic liner material or to bond the material thereto.

It has been found desirable to apply a high-temperature resistant coating 78 to the innermost surface of the inner duct wall 72. That surface is spaced only a slight distance from the engine 28, which generates significant heat during operation. The coating 78 prevents fire damage to the sound-attenuating liner 76. A suitable material for this purpose is MA 25 S silicon ablative coating manufactured by Martin-Marietta Co. The outermost surface of the outer duct wall 70 preferably is make of stainless steel to provide high strength within a tight space.

The transition section fan duct assemblies 66 are shown in FIGS. 9 and 10. Each transition section fan duct 66 comprises an outer duct wall 80, an inner duct wall 82 and a plurality of separators or splitters 84 which hold the inner and outer walls together at specified distances against the fan thrust. Each of the inner and outer walls 80, 82 and each of the splitters 84 is lined or bonded with sound-attenuating material 86 on the airflow surface thereof. Similarly, it has been found desirable to apply a high-temperature resistant coating 88 to the innermost surface of the inner duct wall 82. The outermost surface of the outer duct wall 80 preferably is made of stainless steel.

The sound-attenuating liner material which has been found particularly effective for the purpose of the present invention is a single-layer "DynaRohr" liner material made by Rohr Industries, Inc. That material is shown and described, for example in U.S. Pat. No. 4,379,191, the disclosure of which is incorporated herein by reference. The acoustic liners may be fabricated of many materials and in different sizes and strengths, depending upon specific operating conditions. As shown in FIG. 6, the sound-attenuating liner material preferably comprises a plurality of honeycomb core cells 90, sandwiched between a solid aluminum sheet 92 and a perforated aluminum sheet 94. A woven wire mesh 96 covers the perforated sheet 94 and forms a smooth surface for laminar airflow. The honeycomb core cells 90 communicate with the atmosphere through the perforated sheet 94 and the woven wire mesh 96. As is knwon to those skilled in the art, material of this type may be turned to particular noise frequencies to provide effective acoustic performance. The particular preferred material also provides aerodynamic smoothness and structural integrity. The smooth surface avoids drag, which impedes performance and increases fuel consumption. The acoustic liner gives linear performance and is a broad-band noise absorber. Although the material is sometimes referred to as a "liner", the material in fact is a structural substitute for a solid duct wall and is structurally integrated with the other nacelle components.

The nacelle system of the present invention has been found effective in reducing the noise levels at take-off and landing to compliance with the current FAR 36. On June 28, 1985, The FAA issued a Supplemental Type Certificate ("STC") approving use of the present invention in connection with Pratt & Whitney turbofan JT3D-3B engines in Douglas DC-8-62 and DC-8-62F airplanes. The following Table 1 shows the reduced noise levels achieved with a quiet nacelles at take-off, sideline and landing in a DC-8-62 airplane with JT3D-3B engines at various maximum take-off and landing gross weights, while Table 2 shows comparable information for unmodified nacelles:

TABLE 1

| Max. Take-off Gross Wt (lbs) | Max Landing Gross Wt (lbs) | Quiet Nacelles Take-Off Sideline Landing | | |
|---|---|---|---|---|
| | | (EPN dB) | (EPN dB) | (EPN dB) |
| 350,000 | 250,000 | 104.3 | 98.1 | 108.3 |
| 350,000 | 240,000 | 104.3 | 98.1 | 108.3 |
| 335,000 | 250,000 | 102.5 | 98.2 | 108.3 |
| 335,000 | 240,000 | 102.5 | 98.2 | 108.3 |

TABLE 2

| Max. Take-off Gross Wt (lbs) | Max. Landing Gross Wt (lbs) | Unmodified Nacelles Take-Off Sideline Landing | | |
|---|---|---|---|---|
| | | (EPN dB) | (EPN dB) | (EPN dB) |
| 350,000 | 250,000 | 111.0 | 103.0 | 114.0 |
| 335,000 | 250,000 | 110.0 | 103.0 | 114.0 |

Similarly, on July 15, 1985, the FAA issued an STC approving use of the present invention in connection with Pratt & Whitney turbofan JT3D-7 engines in Douglas DC-8-63 and DC-8-63F airplanes. The following Table 3 shows the reduced noise levels achieved with the quiet nacelles, while Table 4 shows generally comparable information for unmodified nacelles for that aircraft and engines:

TABLE 3

| Max. Take-off Gross Wt (lbs) | Max. Landing Gross Wt (lbs) | Quiet Nacelles Take-Off Sideline Landing | | |
|---|---|---|---|---|
| | | (EPN dB) | (EPN dB) | (EPN dB) |
| 355,000 | 262,000 | 104.1 | 98.2 | 108.5 |
| 355,000 | 258,000 | 104.1 | 98.2 | 108.5 |
| 355,000 | 245,000 | 104.1 | 98.2 | 108.4 |

TABLE 4

| Max. Take-off Gross Wt (lbs) | Max. Landing Gross Wt (lbs) | Unmodified Nacelles Take-Off Sideline Landing | | |
|---|---|---|---|---|
| | | (EPN dB) | (EPN dB) | (EPN dB) |
| 355,000 | 275,000 | 113.9 | 102.8 | 114.3 |

The reduced noise levels shown in Table 1 and 3 meet both FAR 36 noise level requirements and ICAO Annex 16 requirements.

The effect of the reduced noise levels which can be achieved by the present invention is demonstrated graphically in FIG. 2. The drawing shows projected noise "footprints" or contours produced during landing and take-off both by the quiet nacelle system of the invention and by an unmodified nacelle system. The runwayy 100 forms the base line. The noise level contour 102 is for the unmodified system and the much smaller noise level counter 104 is for the system in accordance with the present invention. It should be appreciated that a reduction of 10 EPNdB corresponds to a reduction of 50% in the total perceived noise level.

The components of the invention are advantageously packaged together as a "hush kit". A husk kit is a group of components which are substituted for existing components in a nacelle, such that the nacelle may be retrofitted without replacement of the entire nacelle system. Thus, the hush kit may comprise, within a single package, the elongated nose cowl 20 with the sound-attenuating liner 42; the nose dome extension 54 having the sound-attenuating liner 56; a pair of constant section fan ducts 64 having the sound-attenuating liners 76; and a pair of transition section fan ducts 66 having the sound-attenuating liners 86. The hush kit contains all the necessary major components to retrofit an existing nacelle system. The total weight increase due to the modified components is only about 250 lbs. per nacelle.

The invention has been described with particularity for a DC-8 airplane, as shown in FIG. 1. It has been found that the invention is especially effective when used for Pratt & Whitney JT3D-3B and JT3D-7 low by-pass, fan jet engines used in nacelles for DC-8-62 and DC-8-63 airplanes. However, the invention is applicable to a variety of long duct nacelle systems used with somewhat different engines and airplanes including DC-8-55 and DC-8-61 airplanes. The detailed description is intended to be illustrative of quiet nacelle systems using the present invention in the preferred manner. Nevertheless, it should be appreciated that various modifications could be made in nacelle systems which remain within the spirit and scope of the invention. Many other uses of the invention should be apparent to those working in the industry who are skilled in the art.

We claim:

1. In an aircraft jet engine nacelle adapted to permit operation of the aircraft at low noise levels at take-off and landing, the combination comprising:
   (a) an elongated nose cowl defining an inlet, the nose cowl having an air flow surface with an acoustic liner on substantially the entire airflow surface thereof and an anti-icing portion at the fowardmost portion of the nose cowl and having no acoustic liner thereon,
   (b) a nose dome on a fan section for the engine with no acoustic liner thereon, and a nose dome extension disposed between the nose dome and the fan section, the extension having an airflow surface with an acoustic liner on the airflow surface thereof,
   (c) a long fan duct extending from the fan section to a thrust reverser, the fan duct comprising inner and outer wall portions and splitters disposed between the inner and outer wall portions with the inner and outer wall portions having airflow surfaces with acoustic liners on the airflow surfaces thereof and the splitters having air flow surfaces with acoustic liners on the airflow surfaces thereof,
   (d) forward and aft cowls circumscribing the engine, and
   (e) the thrust reverser and a nozzle defining an exhaust.

2. The combination as in claim 1 wherein the fan duct comprises constant section ducts.

3. The combination as in claim 1 wherein the fan duct comprises transition section ducts.

4. The combination as in claim 1 wherein the acoustic liner is a single layer honeycomb sandwich acoustic material.

5. The combination as in claim 1 wherein the acoustic liner comprises a honeycomb core cell structure having a perforated aluminum sheet covered by a woven wire mesh on the airflow side thereof and a solid aluminum sheet on the rear side thereof.

6. The combination as in claim 1 wherein the inner wall portions of the fan duct have a high-temperature resistant coating on the side adjacent the engine.

7. A quiet nacelle system for a jet airplane, comprising:

(a) a long fan duct jet engine having an inlet and exhaust and fan, combustion and turbine sections,
   (b) an inlet cowl circumscribing the inlet, the inlet cowl comprising an outer barrel, an inner barrel formed of sound-attenuating material and positioned within the outer barrel, an anti-icing lip assembly at the forwardmost portion of and connecting the inner and outer barrles and an aft bulkhead at the rearwardmost portion of the inner and outer barrels,
   (c) a nose dome within the inlet cowl and having an extension at the rearwardmost portion thereof, the extension being formed of sound-attenuating material,
   (d) forward and aft cowls trailing the inlet cowl and circumscribing the fan, combustion and turbine sections of the engine, and
   (e) a long fan duct assembly positioned within the forward and aft cowls and comprising bifurcation, constant section, transition section and aft section ducts, the constant section and transition section ducts being comprised of inner and outer duct walls connected by a plurality of separating means, the inner and outer duct walls and separating means being formed of sound-attenuating material and the inner walls being coated with temperature-resistant means, whereby the elements of the system act synergistically to reduce the engine noise to a quiet level at take-off and landing while maintaining airworthiness, structural integrity and safe flight performance of the airplane.

8. A hush kit for an aircraft jet engine nacelle, comprising:
   (a) an elongated nose cowl adapted to circumscribe an inlet of the engine and having an airflow surface comprised of sound-attenuating material;
   (b) an extended nose dome portion adapted to be attached to a fan of the engine and having an airflow surface comprised of sound-attenuating material;
   (c) a pair of constant-section fan ducts adapted to be disposed between the fan and transition-section fan ducts for the engine and having airflow surfaces and splitters arranged within the fan ducts, the surfaces and splitters both being comprised of sound-attenuating material; and
   (d) a pair of transition-section fan ducts adapted to be disposed between the constant-section fan ducts and rear of the engine and having airflow surfaces and splitters arranged within the fan ducts, the surfaces and splitters both being comprised of sound-attenuating material, whereby the components of the kit are adapted to be substituted for existing components in the nacelle to facilitate reduction of engine noise during take-off and landing of the aircraft.

* * * * *